(No Model.)
G. W. KINGSBURY.
SHEET METAL VESSEL.
No. 539,917. Patented May 28, 1895.
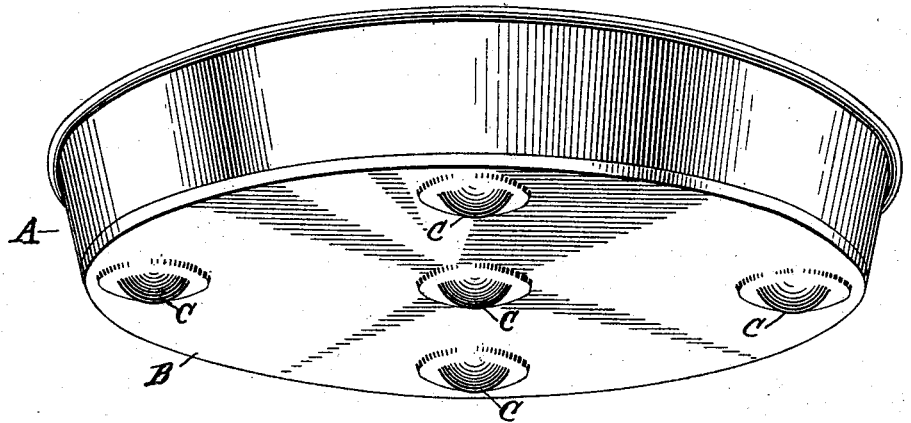
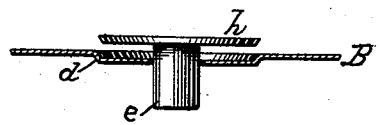   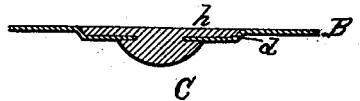
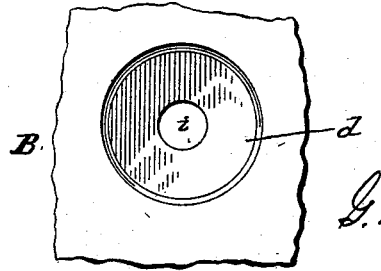
Witnesses
G. W. Kingsbury, Inventor,
by Dodge & Sons,
Attorneys

UNITED STATES PATENT OFFICE.

GEORGE WILSON KINGSBURY, OF ELMIRA, NEW YORK.

SHEET-METAL VESSEL.

SPECIFICATION forming part of Letters Patent No. 539,917, dated May 28, 1895.

Application filed November 1, 1894. Serial No. 527,664. (No model.)

*To all whom it may concern:*

Be it known that I, GEORGE WILSON KINGSBURY, a citizen of the United States, residing at Elmira, in the county of Chemung and State of New York, have invented certain new and useful Improvements in Sheet-Metal Vessels, of which the following is a specification.

My invention relates to sheet metal vessels, and the invention consists in certain improvements in the construction of the bottom of such vessels, as hereinafter more fully set forth.

In the accompanying drawings, Figure 1 is a perspective view showing the under side of a pan or basin with my improvement applied thereto. Figs. 2, 3, and 4 are detail views of a portion of the bottom with the rivets of full size, to more clearly show the construction, and Fig. 5 is a modification of the same.

The object of my invention is two-fold; first, to provide feet or projections to support the vessel and protect the bottom from wear, and, second, to prevent the corrosion or rusting of the vessel.

In the manufacture of sheet metal vessels and utensils, which are usually made of sheet tin, such as pans, pails, tea-kettles, coffee boilers, and the like, it is customary to make the bottom of a plain sheet of tin, and secure it to the bottom of the body, thus leaving the bottom a smooth plain surface. Vessels thus made soon have the tin coating worn off by friction and abrasion, especially near the edge of the bottom on its exterior, and holes are formed in the bottom by abrasion and also by corrosion or rusting of the exposed portions, thereby destroying the utility of the vessel, even though its body portion remains perfect. Another well known source of injury to such vessels, especially when used for holding liquids, is that they corrode or rust on the inside, especially at and around the seams or joints. To prevent these injurious results, I construct the bottom of such vessels with feet or projections C, as shown in Fig. 1, these feet or projections being more or less in number according to the size of the vessel, and so located and of such a size as to support the vessel and its contents, and prevent the bottom plate B from touching or coming in contact with the surface upon which the vessel is set or rests when in use. To form these feet or projections, I first form in the bottom plate B a series of recesses or indentations $d$, as shown more clearly in Figs. 2 and 4, and in the center of each recess make a hole $i$ as shown in Fig. 4. I then provide a series of rivets of the form shown in Fig. 2, with a flat head $h$ of a diameter equal to the recess, and having a stem or body $e$ to fit the hole $i$, and of sufficient length to permit it to be upset and form a rounded projection C, a half an inch, more or less, in depth below the bottom B, as shown in Figs. 1 and 3.

In practice the recesses $d$ and the holes $i$ will be formed in the plate B by means of dies, and may both be made at one operation by using the proper tools. In like manner the rivets will be formed in dies, and so that their heads $h$ will exactly fit and fill the recess $d$, and with their stems or bodies of such size and length as to just fill the hole $i$ and have sufficient metal projecting to form the projection C when upset by a suitable die, as clearly shown in Fig. 3, in which it will be seen that the upset portion projects over the metal of the bottom all around the hole, thus clasping the bottom firmly between the head $h$ and the upset portion C, thereby giving sufficient bearing of the upset portion C upon the exterior surface of the bottom plate as to prevent the rivet from working loose, or being pushed out of place by use. Although the rivet when thus applied will form a tight joint, I prefer to solder its head $h$ to the bottom plate on the inside, so as to form a perfectly smooth surface and leave no crevice for the accumulation or holding of filth or dirt of any kind, and so as to prevent the possibility of any leakage. The soldering of the heads $h$ to the bottom plate may be done either before or after the rivets are upset.

It is obvious that the rivets may be applied without the recesses $d$, in which case the edge of the head $h$ will be beveled in the opposite direction from that shown, so as not to leave an angular recess around their edges for the accumulation of filth, and they will in such case be soldered around their edges or on their entire under surface to the bottom plate; but as such a method of applying them would leave projections upon the upper surface of the bottom equal to the thickness of the heads $h$, I prefer to use the recesses, thereby leaving the surface free from projections of any kind, inside of the vessel, as it will be easier to keep it clean, which is especially important in dairy and culinary utensils.

As it will require a heavy pressure to upset the projecting stem *e* when made of the size and length necessary to leave the feet or projections C of the required height, this pressure may be lessened by using a thick washer *f*, as represented in Fig. 5, it only being necessary to slip the washer on the stem *e* as there shown, and then upset the end of the stem, as indicated by the dotted lines in Fig. 5. If desired, these washers may be made of a diameter equal to that of the head *h*.

It is obvious that the rivets may be formed with heads of the necessary shape and size to constitute the feet; and be inserted from the under side and then be upset from above; but as it would be difficult to make the upset exactly fill the recess, or if used without a recess, would leave a projection on the upper surface, I prefer the plan shown. It will readily be seen that when thus constructed the usual wear and abrasion of the bottom will be entirely obviated, as the feet or projections C will take all the wear.

It has long been known that by uniting an electro-positive and an electro-negative metal, and bringing them in contact with a fluid, a galvanic action will be set up, which will prevent the corrosion or rusting of the metals; and therefore to produce this result and prevent the rusting of sheet metal vessels made on my plan, I form the rivets of a metal which is electrically the opposite of the metal composing the body of the vessel. With vessels made of sheet tin, the rivets may be made of zinc, copper or iron, and produce the desired result. I prefer to use zinc, especialy in vessels or utensils which are not subjected to much heat in use. In tea-kettles, wash-boilers, and the like, which are necessarily subjected to a high degree of heat, copper or iron will be preferable, as they do not fuse as readily as zinc.

It will be readily seen that by my improvement I prevent the wear upon the bottom of sheet metal vessels, and at the same time protect such vessels from rust, thereby greatly increasing their length of service or utility, and correspondingly, their value.

Where the business is conducted on a large scale, with suitable machinery, the bottoms for all the various vessels and utensils in general use, will be made separately with my improvements, and then furnished to the trade as a new article of manufacture; the bodies of the vessels or utensils being made up by the local manufacturers in the usual way, and who can then apply these improved bottoms as readily and as cheaply as they can the old style.

I am aware that it is common to use rivets to unite the parts of articles, such as boilers, baskets, coal hods and the like, and I make no claim for rivets so applied, but I am not aware that any one has ever before constructed bottoms for sheet metal vessels having rivets so applied as to form feet or projections which will prevent the bottom of the vessel from coming in contact with the surface on which said vessel rests when in use, and therefore

What I claim is—

A bottom for sheet metal vessels, composed of a sheet of metal provided with a series of holes each surrounded by a recess, and each having a rivet with a head adapted to fill said recess inserted through said hole and projecting below the bottom sufficiently to be upset and form feet for the vessel to rest upon, said rivets being formed of a metal electrically the opposite of that composing the bottom, substantially as shown and described.

In witness whereof I hereunto set my hand in the presence of two witnesses.

GEORGE WILSON KINGSBURY.

Witnesses:
H. H. ROCKWELL,
FRANK O. ELLIOTT.